United States Patent
Real et al.

(10) Patent No.: US 11,689,888 B2
(45) Date of Patent: *Jun. 27, 2023

(54) SYSTEMS AND METHODS FOR CORRECTION OF GEOGRAPHIC INCONSISTENCY IN ITEM PROPERTIES

(71) Applicant: Walmart Apollo, LLC, Bentonville, AR (US)

(72) Inventors: Sean Paul Real, Lexington, SC (US); Timothy John Stevens, Bella Vista, AR (US); Mahesh Sundar Thangaraj, Centerton, AR (US); Anthony William Helms, Bentonville, AR (US); Brian Dewayne Burge, Centerton, AR (US); Johan Christophe Baer, Centerton, AR (US)

(73) Assignee: Walmart Apollo, LLC, Bentonville, AR (US)

(*) Notice: Subject to any disclaimer, the term of this patent is extended or adjusted under 35 U.S.C. 154(b) by 186 days.

This patent is subject to a terminal disclaimer.

(21) Appl. No.: 17/177,306

(22) Filed: Feb. 17, 2021

(65) Prior Publication Data

US 2021/0168565 A1   Jun. 3, 2021

Related U.S. Application Data

(63) Continuation of application No. 16/588,615, filed on Sep. 30, 2019, now abandoned, which is a
(Continued)

(51) Int. Cl.
*H04W 4/029* (2018.01)
*H04W 4/02* (2018.01)
(Continued)

(52) U.S. Cl.
CPC ............ *H04W 4/029* (2018.02); *H04W 4/02* (2013.01); *H04W 12/06* (2013.01); *H04W 12/63* (2021.01)

(58) Field of Classification Search
CPC .. H04L 63/08–0892; H04W 4/02–029; H04W 12/06–0609
See application file for complete search history.

(56) References Cited

U.S. PATENT DOCUMENTS 5,873,069 A   2/1999   Reuhl
6,182,139 B1  1/2001   Brendel
(Continued)

FOREIGN PATENT DOCUMENTS

EP   1501034    1/2005
GB   2493336    2/2013

OTHER PUBLICATIONS

Search Report from Great Britain patent application No. GB1618638.9 dated Apr. 3, 2017.

*Primary Examiner* — Matthew T Henning
(74) *Attorney, Agent, or Firm* — Fitch, Even, Tabin & Flannery LLP (57) ABSTRACT

Methods, systems, and non-transitory computer readable media are correction of geographic inconsistency in item properties. A system identifies locations of interest based on a location of a mobile device and acquires item-descriptive and item-property data associated with an item at the location of interest. The system connects to a secure network to identify a corresponding item and retrieve corresponding item-property data associated with the corresponding item from a secure item database server. The system determines a difference between the corresponding item-property data and the item-property data and updates the secure item database server based on the difference.

28 Claims, 5 Drawing Sheets

Related U.S. Application Data continuation of application No. 15/342,511, filed on Nov. 3, 2016, now Pat. No. 10,433,100.

(60) Provisional application No. 62/250,746, filed on Nov. 4, 2015.

(51) Int. Cl.
*H04W 12/06* (2021.01)
*H04W 12/63* (2021.01)

(56) References Cited

U.S. PATENT DOCUMENTS

| | | |
|---|---|---|
| 7,198,192 B2 | 4/2007 | Page |
| 7,347,361 B2 | 3/2008 | Lovett |
| 7,441,706 B1 | 10/2008 | Schuessler |
| 7,543,741 B2 | 6/2009 | Lovett |
| 7,810,720 B2 | 10/2010 | Lovett |
| 7,945,484 B1 | 5/2011 | Tam |
| 8,244,832 B1 | 8/2012 | McGuire |
| 8,364,516 B2 | 1/2013 | Anderson |
| 9,355,403 B2 | 5/2016 | Thomas |
| 10,096,043 B2 | 10/2018 | Beck |
| 10,433,100 B2 | 10/2019 | Real |
| 2002/0002504 A1 | 1/2002 | Engel |
| 2005/0160014 A1 | 7/2005 | Moss |
| 2006/0138219 A1 | 6/2006 | Brzezniak |
| 2007/0245352 A1 | 10/2007 | Ma |
| 2007/0290037 A1 | 12/2007 | Arellanes |
| 2010/0191578 A1 | 7/2010 | Tran |
| 2011/0023108 A1 | 1/2011 | Geldermann |
| 2011/0212749 A1 | 9/2011 | Lewis |
| 2012/0158482 A1 | 6/2012 | Paradise |
| 2012/0224076 A1 | 9/2012 | Niedermeyer |
| 2012/0239524 A1 | 9/2012 | Ouimet |
| 2013/0066740 A1 | 3/2013 | Ouimet |
| 2013/0132218 A1 | 5/2013 | Aihara |
| 2013/0339113 A1 | 12/2013 | Junger |
| 2014/0136400 A1 | 5/2014 | Espey, III |
| 2014/0208220 A1 | 7/2014 | Watal |
| 2014/0304294 A1 | 10/2014 | Sharma |
| 2015/0221010 A1 | 8/2015 | Ming |
| 2016/0104189 A1 | 4/2016 | Marcus |
| 2018/0309722 A1 | 10/2018 | Paul |
| 2020/0029177 A1 | 1/2020 | Real |

| Determine a current geographic location of a mobile device in response to satellite broadcasts received by a global positioning system (GPS) receiver of the mobile device. |
| --- |
| 301 |

| Programmatically transmit, by a radio frequency transceiver of the mobile device, the current geographic location to a location service hosted on a location server in communication with the mobile device via a mobile network. |
| --- |
| 303 |

| Receive, from the location service, an identification of a plurality of geographic locations of interest, the geographic locations of interest being identified based, at least in part, on a distance between the current geographic location and the geographic locations of interest. |
| --- |
| 305 |

| Relocate the mobile device from the current geographic location to a selected one of the geographic locations of interest. |
| --- |
| 307 |

| Acquire, by a data reader of the mobile device, item-descriptive data associated with an item at the selected one of the geographic locations of interest. |
| --- |
| 309 |

| Receive, from a user interface of the mobile device, item-property data associated with the item at the selected one of the geographic locations of interest. |
| --- |
| 311 |

| Connect the mobile device to a secure network by transmitting, from the radio frequency transceiver of the mobile device and via the mobile network, user-identification information to a security authentication module of the secure network. |
| --- |
| 313 |

| Programmatically transmit, via the secure network and in response to receiving authentication from the authentication module, the item-descriptive data to a secure item database server in communication with the mobile device via the secure network. |
| --- |
| 315 |

| Receive, from the secure item database server in response to the transmission of the item-descriptive data, (i) an identification of a corresponding item located at a different geographic location from the selected one of the geographic locations of interest, and (ii) corresponding item-property data associated with the corresponding item at the different geographic location. |
| --- |
| 317 |

| Programmatically determine, by a processor of the mobile device, a difference between the item-property data and the corresponding item-property data, the difference effecting a change in corresponding item property data in the secure item database server. |
| --- |
| 319 |

SYSTEMS AND METHODS FOR CORRECTION OF GEOGRAPHIC INCONSISTENCY IN ITEM PROPERTIES

CROSS-REFERENCE TO RELATED PATENT APPLICATIONS

This application is a continuation of U.S. patent application Ser. No. 16/588,615, which is a continuation of U.S. patent application Ser. No. 15/342,511 entitled "SYSTEMS AND METHODS FOR CORRECTION OF GEOGRAPHIC INCONSISTENCY IN ITEM PROPERTIES," filed on Nov. 3, 2016, which claims priority to and the benefit of U.S. Provisional Application No. 62/250,746 filed on Nov. 4, 2015, the contents of all of which are hereby incorporated herein by reference in their entireties.

BACKGROUND

Conventionally, correction of geographic inconsistency in item properties requires manually seeking geographic locations of interest, manual recordation of item-descriptive data and corresponding item-property data at each location of interest, manually determining a differenced value of one or more inconsistencies in the item-property data, and manual correction of those inconsistencies. However, such procedures are time consuming and labor intensive.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3 is a flow diagram illustrating a method for correction of geographic inconsistency in item properties in accordance with various embodiments taught herein.

DETAILED DESCRIPTION

As discussed above, correction of geographic inconsistency in item properties requires manually seeking geographic locations of interest, manual recordation of item-descriptive data and corresponding item-property data at each location of interest, manually determining a differenced value of one or more inconsistencies in the item-property data, and manual correction of those inconsistencies. However, such procedures are time consuming and labor intensive.

Methods, systems, and non-transitory computer readable media are provided herein for correction of geographic inconsistency in item properties. The methods, systems, and non-transitory computer readable media, in accordance with various embodiments, are configured to identify one or more locations of interest based on a determined location of a mobile device. The methods, systems, and non-transitory computer readable media, in accordance with various embodiments, are also configured to use a data reader to read item-descriptive data associated with an item and receive item-property data from a user interface of the mobile device. The methods, systems, and non-transitory computer readable media, in accordance with various embodiments, are also configured to connect to and access a secure network to communicate with a secure item database server. The methods, systems, and non-transitory computer readable media, in accordance with various embodiments, are also configured to receive, from the secure item database server, corresponding item-property data associated with a corresponding item located at a different geographic location for determining a difference between the corresponding item-property data and the item-property data. The methods, systems, and non-transitory computer readable media, in accordance with various embodiments, are also configured to effect a change in the corresponding item-property data based on the difference.

Figure 1:
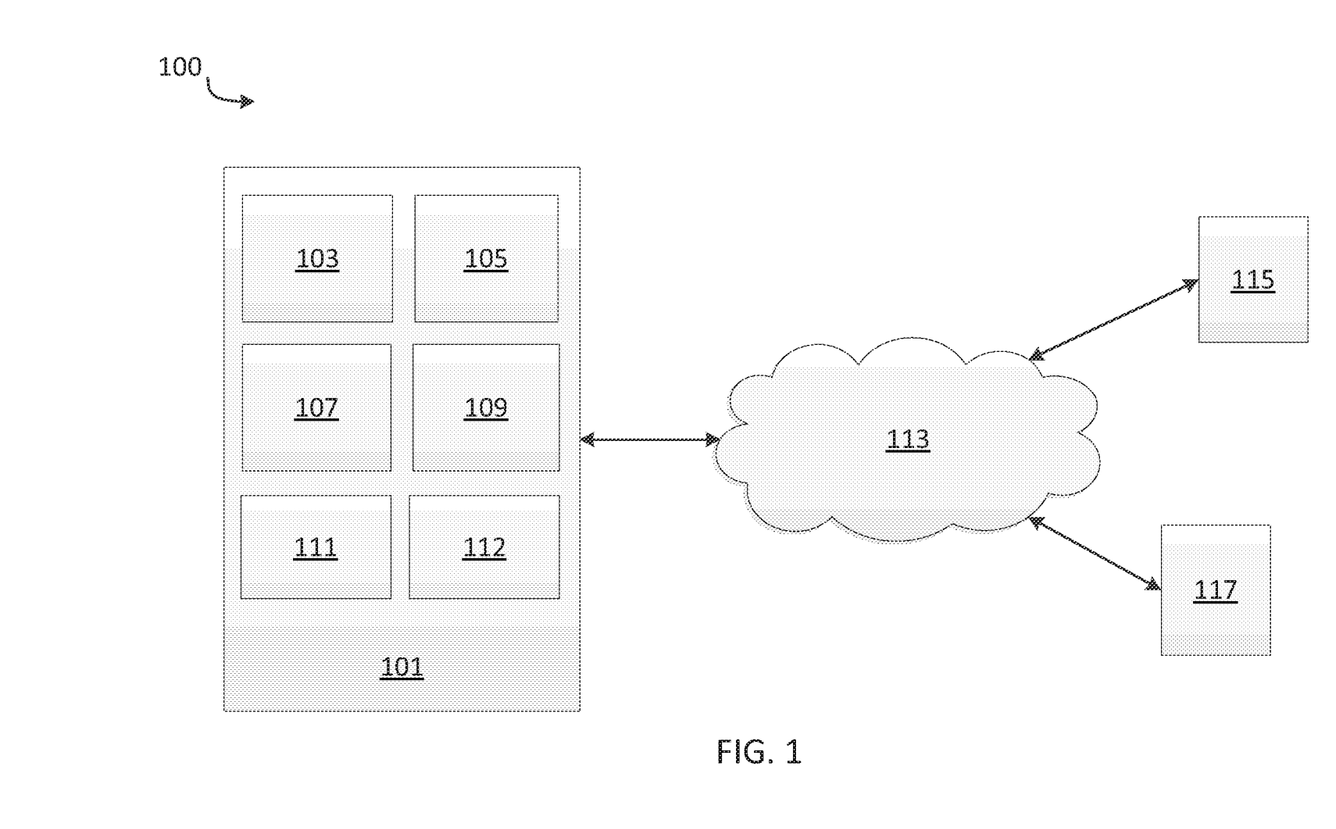
FIG. 1 is a block diagram illustrating a system for correction of geographic inconsistency in item properties in accordance with various embodiments taught herein.

Referring now to FIG. 1, an exemplary system 100 for correction of geographic inconsistency in item properties includes a mobile device 101 including a global positioning system (GPS) receiver 103 for determining a current geographic location of the mobile device 101 based on received satellite broadcasts. The mobile device 101 also includes a communication device 105 for communication via one or more communications networks (e.g., a mobile network, a wi-fi network, a local network, the internet, or a secure network 113) for requesting and receiving a list of geographic locations of interest from a location service (not shown) based on the determined geographic location and for communication with a secure item database server 117. The mobile device 101 also includes a data reader 111 for reading or acquiring item-descriptive data of an item at one or more of the geographic locations of interest. The mobile device 101 also includes a user interface 112 for receiving item-property data associated with the item at the location(s) of interest.

The system 100 also includes an authentication server 115 for authenticating access by the mobile device 101 to the secure network 113 based on user-identification information transmitted by the mobile device 101. The system 100 also includes a secure item database server 117 in communication, after authentication by the authentication server 115, with the mobile device 101 via the secure network 113 for identifying, based on the item-descriptive data, corresponding items and associated corresponding item-property data. The mobile device 101 also includes a memory 109 for storing the item-descriptive data, the item-property data, and the corresponding item-property data and a processor 107 for determining a difference (inconsistency) between the item-property data and the corresponding item-property data. The mobile device 101 is also configured to effect a change in the corresponding item-property data in the secure item database server 117.

Mobile device 101 can be any suitable device including, for example, a smartphone, a cellular phone, a satellite phone, a tablet, a personal digital assistant (PDA), a laptop, a wireless barcode scanner, a handheld computing device, other portable electronic devices, or combinations thereof. The communication device 105 of the mobile device 101, in accordance with various embodiments can include, for example, but is not limited to, a radio frequency (RF) transceiver, a near-field communication (NFC) device, a Bluetooth® transceiver, a built-in network adapter, a network interface card, a Personal Computer Memory Card International Association (PCMCIA) network card, a card bus network adapter, a wireless network adapter, a USB network adapter, a modem, or any other device suitable for interfacing with any type of network capable of communication and performing the operations described herein.

Processor 107, in accordance with various embodiments can include, for example, but is not limited to, a microchip, a processor, a microprocessor, a special purpose processor, an application specific integrated circuit, a microcontroller, a field programmable gate array, any other suitable processor, or combinations thereof. Memory 109, in accordance with various embodiments can include, for example, but not limited to, hardware memory, non-transitory tangible media, magnetic storage disks, optical disks, flash drives, computational device memory, random access memory, such as but not limited to DRAM, SRAM, EDO RAM, any other type of memory, or combinations thereof.

The item-descriptive data, in accordance with various embodiments, can be a written description of the item, a packaging design, a barcode, a one-dimensional barcode, a two-dimensional barcode, a UPC code, an EAN code, a Code 39, a Code 93, Code 128, an ITF, a codabar, a GS1 databar, an MSI Plessey, a QR code, a Datamatrix code, a PDF417, or an Aztec associated with the item. Data reader 111 can be any device suitable for acquiring and/or transmitting item-descriptive data, including for example, an RFID reader, a NFC reader, a barcode reader, a digital camera, a mobile device, a magnetic strip reader, a point of sale terminal, any other suitable device, or combinations thereof. Although shown and described herein as being integrated within the mobile device 101, it will be apparent in view of this disclosure that, in accordance with various embodiments, the data reader 111 can be a separate device in communication with the mobile device 101 (e.g., a portable barcode scanner linked with the mobile device 101 via a Bluetooth® connection).

User interface 112 can be, in accordance with various embodiments, a touch screen display, a display and keyboard, a display and pointing device (e.g., trackball or mouse), or any other combination of suitable components. The item-property data received at the user interface 112 can include, for example, a price, a sale status, a discount status, a stocked quantity of the item, a department location of the item, any other item-property related data, or combinations thereof. The user interface 112 can also include one or more software applications for operating the system 100.

Secure network 113, in accordance with various embodiments, can be, for example, a Wireless Encryption Protocol (WEP) network, a Wireless Protected Access (WPA) network, a WP A2 network, a DMZ network (perimeter network), a wireless access protocol (WAP) network, other encrypted networks, or combinations thereof. Authentication server 115 can include, for example, any computational device, such as a workstation, desktop computer, server, laptop, handheld computer, tablet computer, mobile device, or other form of computing or telecommunications device that is capable of communication and that has sufficient processor power and memory capacity to receive user-identification information and authenticate users of a secure network 113. Secure item database server 117 can include, for example, any computational device, such as a workstation, desktop computer, server, laptop, handheld computer, tablet computer, mobile device, or other form of computing or telecommunications device that is capable of communication and that has sufficient processor power and memory capacity to store, query, and update item-property data associated with a plurality of items and corresponding items. More generally, server, as used herein with reference to any of the various servers described, can include, for example, any computational device, such as a workstation, desktop computer, server, laptop, handheld computer, tablet computer, mobile device, or other form of computing or telecommunications device that is capable of communication and that has sufficient processor power and memory capacity to perform the described function of each server.

In accordance with various embodiments, a user can operate the mobile device to commence use of the system 100. The system 100 can use the GPS receiver 103 to determine a location of the mobile device 101 and then, using the communication device 105, can transmit a request for and receiver a list of geographic locations of interest from the location service. The user can then relocate the mobile device 101 to one of the locations of interest. At the location of interest, the system 100 can use the data reader 111 to acquire item-descriptive data associated with an item at the location of interest. In response to acquisition of the item-descriptive data, the system 100 can prompt a user, via the user interface 112, to enter item-property data associated with the item at the location of interest.

In response to receiving the item-property data, the system 100 can use the communication device 105 to transmit user-identification information to the authentication server 115 via the secure network 113. In response to receipt of authentication from the authentication server 115, the system 100 can use the communication device 105 to transmit, via the secure network 113, the item-descriptive data and the item-property data to the secure item database server 117. The system 100 can then receive, from the secure item database server 117 in response to the transmission of the item-descriptive data and the item-property data, 1) an identification of a corresponding item located at a different geographic location and 2) corresponding item-property data associated with the corresponding item at the different geographic location.

The system 100 can use the processor 107 to determine a difference (inconsistency) between the item-property data associated and the item at the location of interest and the corresponding item-property data associated with the corresponding item at the different geographic location. The system 100 can use the communication device 105 to transmit instructions to the secure item database server 117 to update the corresponding item-property data stored therein based on the determined difference.

Figure 2:
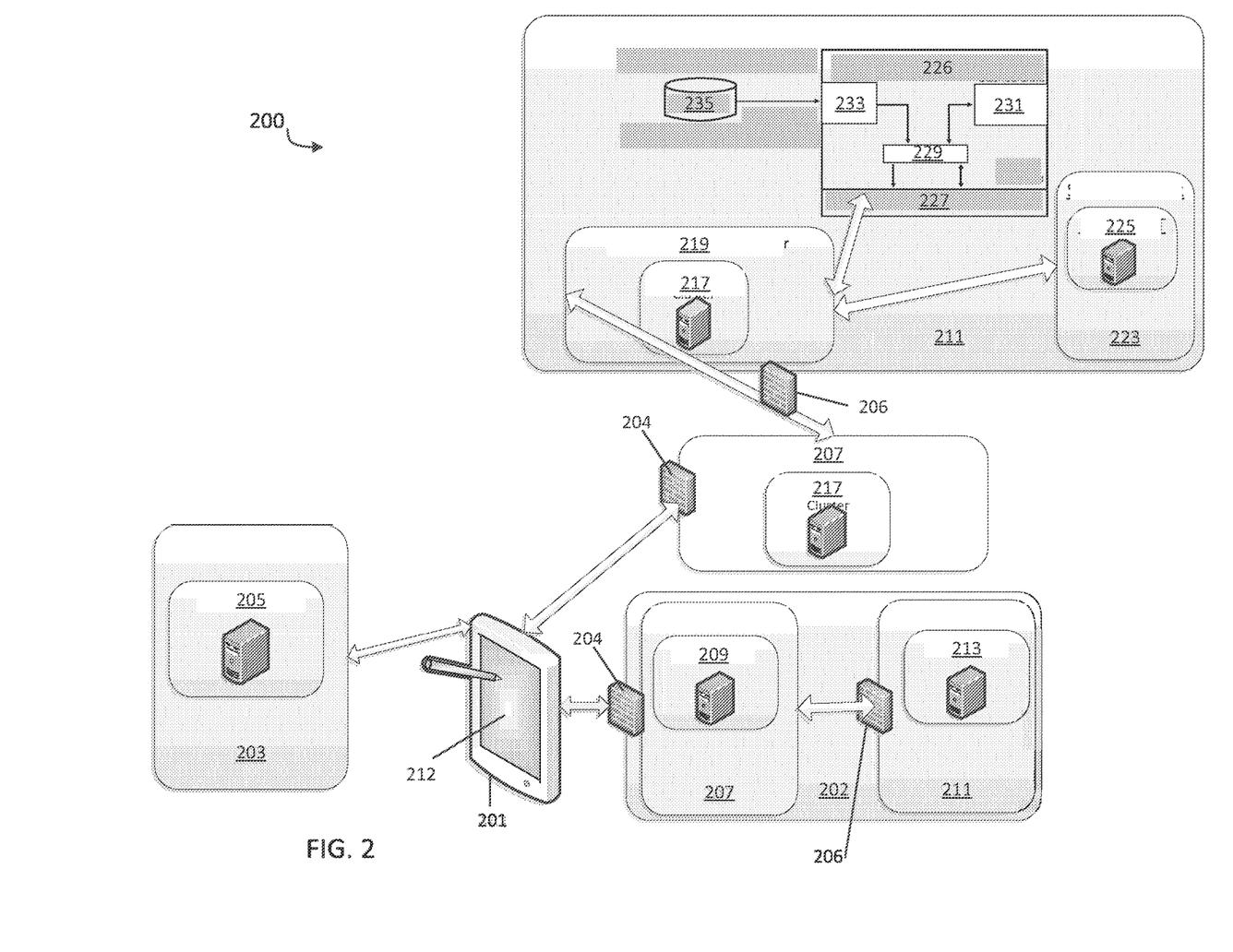
FIG. 2 is a system flow diagram illustrating correction of geographic inconsistency in item properties in accordance with various embodiments taught herein.

As illustrated by FIG. 2, by way of non-limiting example, in one application of the technology described herein, a system 200, in accordance with various embodiments, can be used for competitive shopping research by associates of a retailer. The associate can launch an application on a mobile device 201 and input user-identifying information via a user interface 212 of the mobile device 201. The mobile device 201 can transmit the user-identifying information to a secure network 202 having a first firewall 204. Firewall, as used herein can include any suitable firewall including, for example, a packet firewall, a stateful firewall, an application-layer firewall, a proxy firewall, a next-generation firewall, or a unified threat management system).

The first firewall 204 directs the transmission to a threat management server 209 (e.g., a proxy server) of a DMZ network 207. The threat management server 209 then transmits the user-identifying information through a second firewall 206, which directs the transmission to an authentication server 213 of an internal retailer network 211, which verifies the user-identifying information for authentication of the mobile device 201. The application then permits the associate to proceed with competitive shopping research.

The associate then instructs the application to determine a location of the mobile device 201 and request a list of locations of interest (e.g., competitor retail locations) from a location service 203 having a location server 205. The associate then relocates the mobile device to one of the competitor locations and uses a data reader of the mobile device 201 to acquire item-descriptive data (e.g., by scanning a barcode of a product within the competitor location) identifying an item for competitive research. Upon acquiring the item-descriptive data associated with the item for competitive research, the associate can input item-property data associated with the item for competitive research such as, for example, a price, a stocked quantity, a department location, etc.

The mobile device 201 can transmit the item-descriptive data and the item-property data to the DMZ network 207 having the first firewall 204. The first firewall 204 can direct the item-descriptive data and the item-property data to a server cluster 217 of a load balancer 219, the server cluster 217 in communication with the DMZ network 207 and, through the second firewall, the internal retailer network 211. The load balancer 219 controls data flow on the internal retailer network 211. The load balancer 219 can submit the item-descriptive data and the item-property data to one or more store servers 225 located on individual retail store networks 223 within the internal retailer network 211 to retrieve an identification of a corresponding item corresponding to the item for competitive research and corresponding item-property data stored thereon. The load balancer 219 can also submit the item-descriptive data and the item-property data to a representational state transfer (REST) interface 227 of a secure item database server 226. The secure item database server 226 includes a delegator 229 for submitting the item-descriptive data and the item-property data to one or more of an object-relational mapping (ORM) query or a cache as a service (CAAS) for querying a secure item database 235 of the secure item database server 226 to retrieve the identification of the corresponding item corresponding to the item for competitive research and the corresponding item-property data stored therein. It will be apparent in view of this disclosure that, in accordance with various embodiments, the load balancer 219 can submit the item-descriptive data and the item-property data to both the one or more store servers 225 and the secure item database server 226 to retrieve the identification of the corresponding item corresponding to the item for competitive research and the corresponding item-property data.

The retrieved identification of the corresponding item corresponding to the item for competitive research and the corresponding item-property data can then be sent, via the internal retailer network 211 and through the DMZ network 207 to the mobile device 201. The mobile device 201 can then determine a difference (inconsistency) between the item property data associated and the item for competitive research with the corresponding item-property data associated with the corresponding item for competitive research. In response to determining the difference (e.g., a price difference between a similar item at the retail associate's store), the mobile device 201 can transmit instructions, via the DMZ network 207 and the internal store network 211, to the one or more store servers 225 to update the corresponding item-property data stored thereon (e.g., reduce or increase an item price of the retailer). In response to determining the difference, the mobile device 201 can also transmit instructions, via the DMZ network 207 and the internal store network 211, to the secure item database server 226 to update the corresponding item property data stored in the secure item database 235.

Thus the associate does not need to manually research and seek out competitor locations and does not need to manually record item-descriptive data and item-property data in a log. The associate also does not need to complete the trip and wait, until returning to the associate's store, to manually determine inconsistencies in the corresponding item-property data and update the corresponding item-property data. Thus the associate can advantageously correct inconsistencies in pricing or other item-property data at disparate locations in real time and, if desired, can respond to any differences by updating corresponding item-property data of the item at the retailer in real time, without delays associated with returning to the retailer location for manual determination of inconsistencies and item-property updates. However, it will be apparent in view of this disclosure that the associate can, in accordance with various embodiments, choose not to update the item-property data or choose to wait until returning to the associate's retail location to review the inconsistencies and update the item-property data from at an in-store terminal of the individual store network 223 associated with the associate's retail location.

Referring now to FIG. 3, a method 300 is provided for correction of geographic inconsistency in item properties. The method includes a step 301 of determining a current geographic location of a mobile device in response to satellite broadcasts received by a global positioning system (GPS) receiver of the mobile device. The method includes a step 303 of programmatically transmitting, by a communication device of the mobile device, the current geographic location to a location service hosted on a location server in communication with the mobile device via a mobile network. At step 305, the method includes receiving, from the location service, an identification of a plurality of geographic locations of interest, the geographic locations of interest being identified based, at least in part, on a distance between the current geographic location and the geographic locations of interest. At step 307, the method includes relocating the mobile device from the current geographic location to a selected one of the geographic locations of interest. At step 309, the method includes acquiring, by a data reader of the mobile device, item-descriptive data associated with an item at the selected one of the geographic locations of interest.

At step 311, the method includes receiving, from a user interface of the mobile device, item-property data associated with the item at the selected one of the geographic locations of interest. At step 313 the method includes connecting the mobile device to a secure network by transmitting, from the communication device of the mobile device and via the mobile network, user-identification information to a security authentication module of the secure network. At step 315 the method includes programmatically transmitting, via the secure network and in response to receiving authentication from the authentication module, the item-descriptive data to a secure item database server in communication with the mobile device via the secure network. At step 317 the method includes receiving, from the secure item database server in response to the transmission of the item-descriptive data, (i) an identification of a corresponding item located at a different geographic location from the selected one of the geographic locations of interest, and (ii) corresponding item-property data associated with the corresponding item at the different geographic location. At step 319 the method includes programmatically determining, by a processor of the mobile device, a difference between the item-property data and the corresponding item-property data, the difference effecting a change in corresponding item-property data in the secure item database server.

The step 301 of determining a current geographic location of a mobile device in response to satellite broadcasts received by a global positioning system (GPS) receiver of the mobile device can be performed, for example but not limited to, using GPS receiver 103 of mobile device 101 as described above with reference to FIG. 1. The step 303 of programmatically transmitting, by a communication device of the mobile device, the current geographic location to a location service hosted on a location server in communication with the mobile device via a mobile network can be performed, for example but not limited to, using the communication device 105 of the mobile device 101 to transmit the geographic location to a location service as described above with reference to FIG. 1. The step 305 of receiving, from the location service, an identification of a plurality of geographic locations of interest, the geographic locations of interest being identified based, at least in part, on a distance between the current geographic location and the geographic locations of interest can be performed, for example but not limited to, using the communications device 105 of the mobile device 101 to receive the geographic locations of interest as described above with reference to FIG. 1.

The step 307 of relocating the mobile device from the current geographic location to a selected one of the geographic locations of interest can be performed, for example but not limited to, by relocating the mobile device 101 as described above with reference to FIG. 1. The step 309 of acquiring, by a data reader of the mobile device, item-descriptive data associated with an item at the selected one of the geographic locations of interest can be performed, for example but not limited to, using the data reader 111 of the mobile device 101 to read item-descriptive data as described above with reference to FIG. 1. The step 311 of receiving, from a user interface of the mobile device, item-property data associated with the item at the selected one of the geographic locations of interest can be performed, for example but not limited to, receiving item-property data via the user interface 112 of the mobile device 101 as described above with reference to FIG. 1.

The step 313 of connecting the mobile device to a secure network by transmitting, from the communication device of the mobile device and via the mobile network, user-identification information to a security authentication module of the secure network can be performed, for example but not limited to, using the communication device 105 of the mobile device 101 to transmit user-identifying information via a secure network 113 to an authentication server 115 as described above with reference to FIG. 1. The step 315 of programmatically transmitting, via the secure network and in response to receiving authentication from the authentication module, the item-descriptive data to a secure item database server in communication with the mobile device via the secure network can be performed, for example but not limited to, using the communication device 105 of the mobile device 101 to receive authentication from the authentication server 115 via the secure network and to transmit the item-descriptive data and the item-property data to the secure item database server 117 via the secure network 113 as described above with reference to FIG. 1.

The step 317 of receiving, from the secure item database server in response to the transmission of the item-descriptive data, (i) an identification of a corresponding item located at a different geographic location from the selected one of the geographic locations of interest, and (ii) corresponding item-property data associated with the corresponding item at the different geographic location can be performed, for example but not limited to, using the communication device 105 of the mobile device 101 to receive an identification of the corresponding item and corresponding item-property data from the secure item database server 117 via the secure network 113 as described above with reference to FIG. 1. The step 319 of programmatically determining, by a processor of the mobile device, a difference between the item-property data and the corresponding item-property data, the difference effecting a change in corresponding item-property data in the secure item database server can be performed, for example but not limited to, using the processor 107 of the mobile device 101 to determine a difference (inconsistency) between the item-property data and the corresponding item-property data and using the communication device 105 of the mobile device 101 to transmit instructions for updating the corresponding item-property data to the secure item database server 117 via the secure network 113 as described above with reference to FIG. 1.

Exemplary Computing Devices

Figure 4:
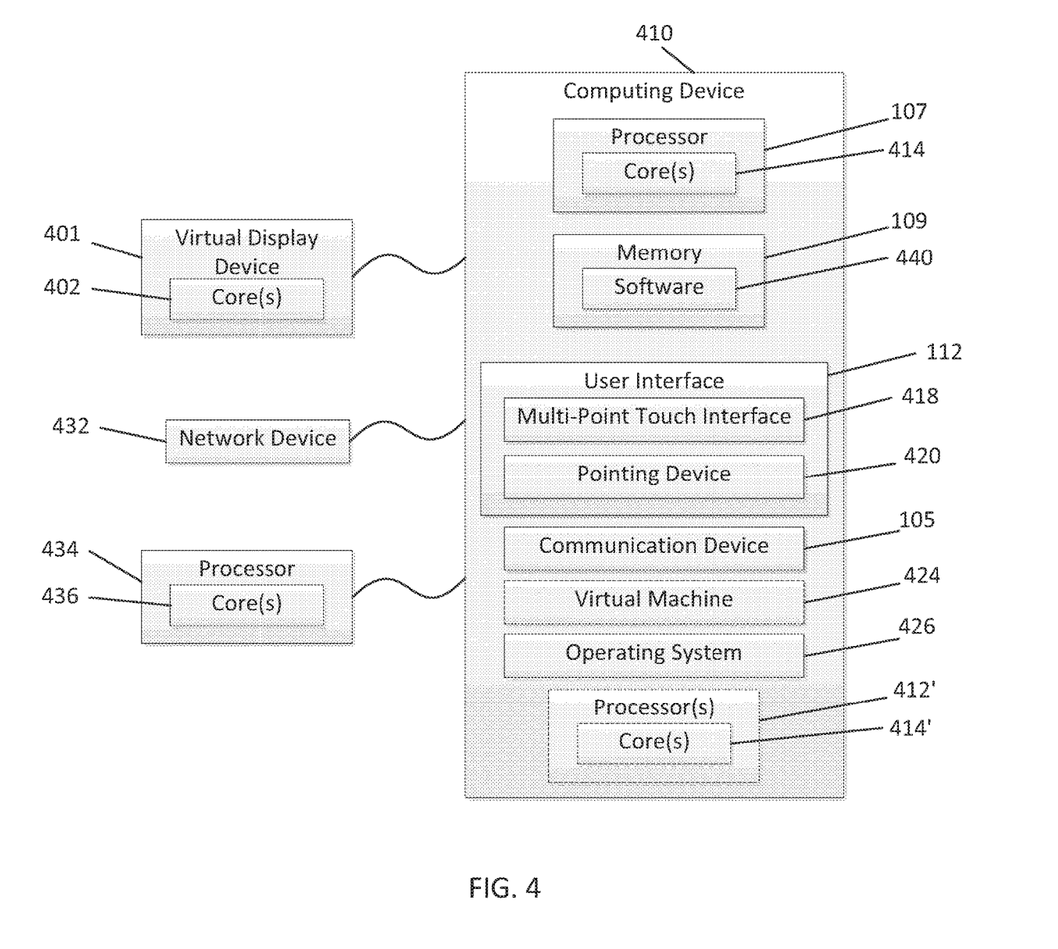
FIG. 4 is an example computational device block diagram depicting various components which can be used to implement various embodiments taught herein.

FIG. 4 is a block diagram of an exemplary computing device 410 such as can be used, or portions thereof, in accordance with various embodiments and, for clarity, refers back to and provides greater detail regarding various elements of the system 100 of FIG. 1. The computing device 410 can include one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 109 included in the computing device 410 can store computer-readable and computer-executable instructions or software for performing the operations disclosed herein. For example, the memory 109 can store a software application 440 which is configured to perform various of the disclosed operations (e.g., determine a difference between received corresponding item-property data and acquired item-property data using processor 107 and update the corresponding item-property data in the secure item database server 117). The computing device 410 can also include configurable and/or programmable processor 107 and an associated core 414, and optionally, one or more additional configurable and/or programmable processing devices, e.g., processor(s) 412' and associated core(s) 414' (for example, in the case of computational devices having multiple processors/cores), for executing computer-readable and computer-executable instructions or software stored in the memory 109 and other programs for controlling system hardware. Processor 107 and processor(s) 412' can each be a single core processor or multiple core (414 and 414') processor.

Virtualization can be employed in the computing device 410 so that infrastructure and resources in the computing device can be shared dynamically. A virtual machine 424 can be provided to handle a process running on multiple processors so that the process appears to be using only one computing resource rather than multiple computing resources. Multiple virtual machines can also be used with one processor.

Memory 109 can include a computational device memory or random access memory, such as DRAM, SRAM, EDO RAM, and the like. Memory 109 can include other types of memory as well, or combinations thereof.

A user can interact with the computing device 410 through a visual display device 428, such as a computer monitor, which can display one or more user interfaces 112 that can be provided in accordance with exemplary embodiments. The computing device 410 can include other I/O devices for receiving input from a user, for example, a keyboard or any suitable multi-point touch interface 418, a pointing device 420 (e.g., a mouse). The keyboard 418 and the pointing device 420 can be coupled to the visual display device 428. The computing device 410 can include other suitable conventional I/O peripherals.

The computing device 410 can also include one or more storage devices 434, such as a hard-drive, CD-ROM, or other computer readable media, for storing data and computer-readable instructions and/or software that perform operations disclosed herein. Exemplary storage device 434 can also store one or more databases for storing any suitable information required to implement exemplary embodiments. The databases can be updated manually or automatically at any suitable time to add, delete, and/or update one or more items in the databases.

The computing device 410 can include a communication device 105 configured to interface via one or more network devices 432 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The communication device 112 can include a built-in network adapter, network interface card, PCMCIA network card, card bus network adapter, wireless network adapter, USB network adapter, modem, radio frequency transceiver, or any other device suitable for interfacing the computing device 410 to any type of network capable of communication and performing the operations described herein. Moreover, the computing device 410 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 410 can run any operating system 426, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 426 can be run in native mode or emulated mode. In an exemplary embodiment, the operating system 426 can be run on one or more cloud machine instances.

Figure 5:
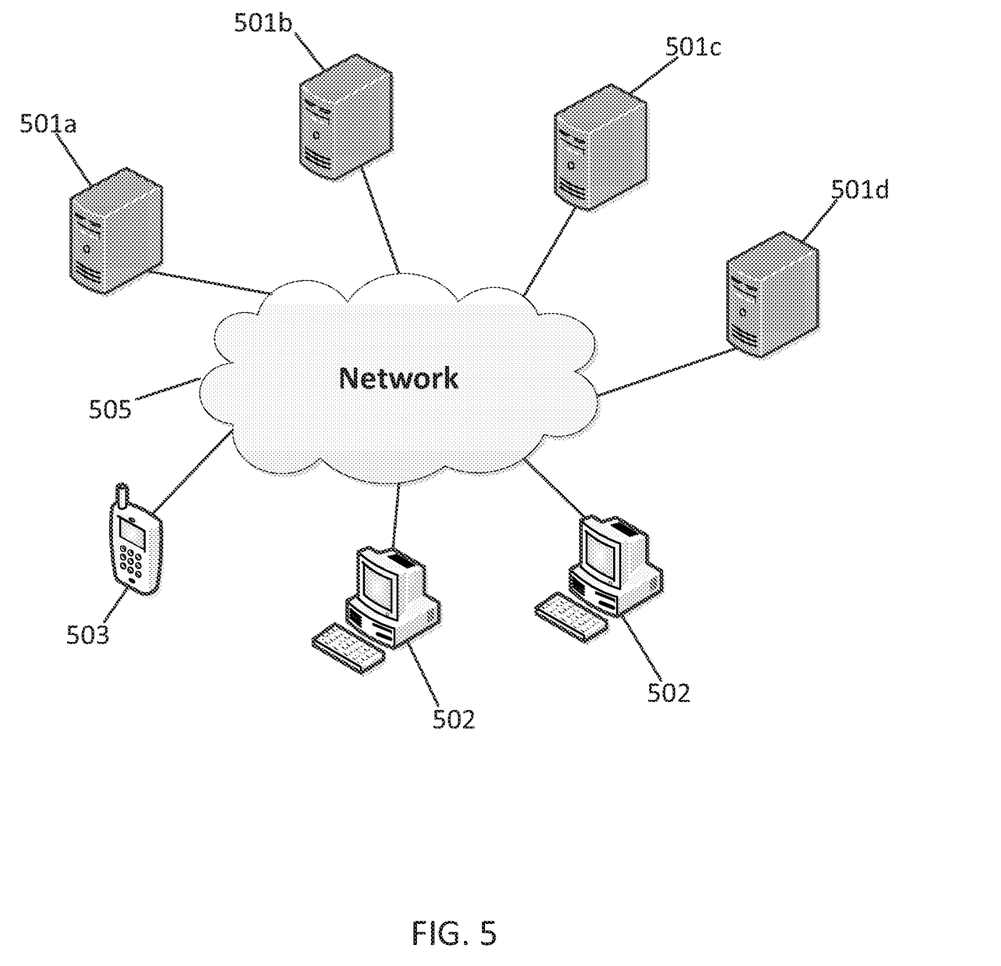
FIG. 5 is an example computational device block diagram depicting various components which can be used to implement various embodiments taught herein in a distributed system.

FIG. 5 is an example computational device block diagram of certain distributed embodiments. Although FIG. 1, and portions of the exemplary discussion above, make reference to a centralized system 100 operating on a single computing device, one will recognize that various of the modules within the system 100 may instead be distributed across a network 505 in separate server systems 501a-d and possibly in user systems, such as a desktop computer device 502, or mobile computer device 503. As one example, users may download an application to their desktop computer device or mobile computer device, which is configured to run the system 100 for correction of geographic inconsistency in item properties. As another example, the user interface 112 can be a client side application of a client-server environment, wherein the system 100 for correction of geographic inconsistency in item properties is hosted by a server and interacted with by the desktop computer device or mobile device. In some distributed systems, various modules or components of the system 100 can be separately located on server systems 501a-d and can be in communication with one another across the network 505.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A system comprising:
   a mobile device, the mobile device including:
   a location receiver,
   a communication device,
   a data reader,
   a user interface,
   a memory, and
   a processor;
   a secure network having an authentication server, the secure network in communication with the mobile device via a mobile network; and
   a secure item database server in selective communication with the mobile device via the secure network based on authenticating by the authentication server,
   the memory of the mobile device includes instructions that when executed by the processor cause the mobile device to:
   determine a first geographic location of the mobile device in response to broadcasts received by the location receiver of the mobile device;
   transmit, by the communication device, the first geographic location to the location service hosted on the location server in communication with the mobile device via the mobile network;
   receive, from the location service, an identification of a plurality of geographic locations of interest, the plurality of geographic locations of interest having been identified based, at least in part, on distances between the first geographic location and each of the plurality of geographic locations of interest;

acquire, by the data reader, item-descriptive data associated with an item at the first geographic location, receive, from the user interface, item-property data associated with the item at the first geographic location, transmit, user-identifying information from the mobile device to one or more servers, wherein the one or more servers in response to a determination that the user-identifying information is not a threat transmit a message to the mobile device authorizing relocation;

detect, via the location receiver, a relocation of the mobile device from the first geographic location to a selected one of the plurality of geographic locations of interest;

receive, from the secure item database server in response to the transmission of an item-descriptive data, (i) an identification of a corresponding item located at the first geographic location, and (ii) corresponding item-property data associated with the corresponding item at the first geographic location;

receive, from the user interface, item-property data associated with the item at the selected one of the plurality of geographic locations of interest; and determine a difference between the item-property data at the selected one of the plurality of geographic locations of interest and the corresponding item-property data at the first geographic location, the difference effecting a change in corresponding item-property data in the secure item database server.

2. The system of claim 1, the memory further including instructions that, when executed by the processor, effect the change in corresponding item-property data in the secure item database server by causing the mobile device to instruct the secure item database server to update the corresponding item-property data associated with the corresponding item at the first geographic location to match the item-property data associated with the item at the selected one of the plurality of geographic locations of interest.

3. The system of claim 1, wherein the item associated with the selected one of the plurality of geographic locations of interest is the same as the corresponding item associated with the first geographic location.

4. The system of claim 1, wherein the item associated with the selected one of the plurality of geographic locations of interest is different than the corresponding item associated with the first geographic location, further wherein at least one of an item category, an item type, an item function, or an item classification indicated by the item-descriptive data associated with the item at the selected one of the plurality of geographic locations of interest is the same as at least one of the item category, the item type, the item function, or the item classification of the corresponding item associated with the first geographic location.

5. The system of claim 1, wherein the communication device is at least one of a radio frequency (RF) transceiver, a near-field communication (NFC) device, a Bluetooth® transceiver, a built-in network adapter, a network interface card, a Personal Computer Memory Card International Association (PCMCIA) network card, a card bus network adapter, a wireless network adapter, a USB network adapter, or a modem.

6. The system of claim 1, wherein the step of acquiring item-descriptive data is performed by scanning or photographing at least one of a barcode, a one-dimensional barcode, a two-dimensional barcode, a UPC code, an EAN code, a Code 39, a Code 93, Code 128, an ITF, a codabar, a GS1 databar, an MSI Plessey, a QR code, a Datamatrix code, a PDF417, or an Aztec associated with the item.

7. The system of claim 1, wherein the step of acquiring item-descriptive data is performed by interrogating an RFID tag associated with the item.

8. The system of claim 1, wherein the item-property data includes a price of the item.

9. A method comprising:

determining a first geographic location of a mobile device in response to broadcasts received by a location receiver of the mobile device;

transmitting, by the communication device, the first geographic location to the location service hosted on the location server in communication with the mobile device via the mobile network;

receiving, from the location service, an identification of a plurality of geographic locations of interest, the plurality of geographic locations of interest having been identified based, at least in part, on distances between the first geographic location and each of the plurality of geographic locations of interest;

acquiring, by the data reader, item-descriptive data associated with an item at the first geographic location;

receiving, from a user interface, item-property data associated with the item at the selected one of the plurality of geographic locations of interest;

transmitting user-identifying information from the mobile device to one more servers, the one or more servers in response to a determination that the user-identifying information is not a threat transmit a message to the mobile device authorizing relocation;

detecting, via the location receiver, a relocation of the mobile device from the first geographic location to a selected one of the plurality of geographic locations of interest;

receiving, from the secure item database server in response to the transmission of an item-descriptive data, (i) an identification of a corresponding item located at the first geographic location, and (ii) corresponding item-property data associated with the corresponding item at the first geographic location;

receiving, from the user interface, item-property data associated with the item at the selected one of the plurality of geographic locations of interest; and determining a difference between the item-property data at the selected one of the geographic locations of interest and the corresponding item-property data, at the first geographic location, the difference effecting a change in corresponding item-property data in the secure item database server.

10. The method of claim 9, wherein effecting a change in corresponding item-property data in the secure item database server is achieved by programmatically instructing the secure item database server to update the corresponding item-property data associated with the corresponding item at the first geographic location to match the item-property data associated with the item at the selected one of the plurality of geographic locations of interest.

11. The method of claim 9, wherein the item associated with the selected one of the plurality of geographic locations of interest is the same as the corresponding item associated with the first geographic location.

12. The method of claim 9, wherein the item associated with the selected one of the plurality of geographic locations of interest is different than the corresponding item associated with the first geographic location.

13. The method of claim 12, wherein at least one of an item category, an item type, an item function, or an item classification indicated by the item-descriptive data associated with the item at the selected one of the plurality of geographic locations of interest is the same as at least one of the item category, the item type, the item function, or the item classification of the corresponding item associated with the first geographic location.

14. The method of claim 9, wherein the step of acquiring item-descriptive data is performed by scanning or photographing at least one of a barcode, a one-dimensional barcode, a two-dimensional barcode, a UPC code, an EAN code, a Code 39, a Code 93, Code 128, an ITF, a codabar, a GS1 databar, an MSI Plessey, a QR code, a Datamatrix code, a PDF417, or an Aztec associated with the item.

15. The method of claim 9, wherein the step of acquiring item-descriptive data is performed by interrogating an RFID tag associated with the item.

16. The method of claim 9, wherein the item-property data includes a price of the item.

17. A non-transitory computer readable medium having instructions stored thereon that, when executed by a processor, cause a mobile device to:
  determine a first geographic location of the mobile device in response to broadcasts received by a location receiver of the mobile device;
  transmit, by the communication device, the first geographic location to the location service hosted on the location server in communication with the mobile device via the mobile network;
  receive, from the location service, an identification of a plurality of geographic locations of interest, the plurality of geographic locations of interest having been identified based, at least in part, on distances between the first geographic location and each of the plurality of geographic locations of interest;
  acquire, by the data reader, item-descriptive data associated with an item at the first geographic location;
  receive, from a user interface, item-property data associated with the item at the selected one of the plurality of geographic locations of interest;
  transmit user-identifying information from the mobile device to one or more servers, wherein the one or more servers in response to a determination that the user-identifying information is not a threat transmit a message to the mobile device authorizing relocation;
  detect, via the location receiver, a relocation of the mobile device from the first geographic location to a selected one of the plurality of geographic locations of interest;
  receive, from the secure item database server in response to the transmission of an item-descriptive data, (i) an identification of a corresponding item located at the first geographic location, and (ii) corresponding item-property data associated with the corresponding item at the first geographic location;
  receive, from the user interface, item-property data associated with the item at the selected one of the plurality of geographic locations of interest; and
  determine a difference between the item-property data at the selected one of the geographic locations of interest and the corresponding item-property data at the first geographic location, the difference effecting a change in corresponding item-property data in the secure item database server.

18. The non-transitory computer readable medium of claim 17, wherein effecting a change in corresponding item-property data in the secure item database server is achieved by programmatically instructing the secure item database server to update the corresponding item-property data associated with the corresponding item at the first geographic location to match the item-property data associated with the item at the selected one of the plurality of geographic locations of interest.

19. The non-transitory computer readable medium of claim 17, wherein the item associated with the selected one of the plurality of geographic locations of interest is the same as the corresponding item associated with the first geographic location.

20. The non-transitory computer readable medium of claim 17, wherein the item associated with the selected one of the plurality of geographic locations of interest is different than the corresponding item associated with the first geographic location, further wherein at least one of an item category, an item type, an item function, or an item classification indicated by the item-descriptive data associated with the item at the selected one of the plurality of geographic locations of interest is the same as at least one of the item category, the item type, the item function, or the item classification of the corresponding item associated with the first geographic location.

21. A mobile device comprising:
  a location receiver,
  a communication device,
  a data reader,
  a user interface,
  a memory, and
  a processor, wherein the processor is configured to:
  determine a first geographic location of the mobile device in response to broadcasts received by the location receiver of the mobile device;
  transmit, by the communication device, the first geographic location to the location service hosted on the location server in communication with the mobile device via the mobile network;
  receive, from the location service, an identification of a plurality of geographic locations of interest, the plurality of geographic locations of interest having been identified based, at least in part, on distances between the first geographic location and each of the plurality of geographic locations of interest;
  acquire, by the data reader, item-descriptive data associated with an item at the first geographic location,
  receive, from the user interface, item-property data associated with the item at the first geographic location,
  transmit, user-identifying information from the mobile device to one or more servers, wherein the one or more servers in response to a determination that the user-identifying information is not a threat transmit a message to the mobile device authorizing relocation;
  detect, via the location receiver, a relocation of the mobile device from the first geographic location to a selected one of the plurality of geographic locations of interest;
  receive, from a secure item database server in response to the transmission of an item-descriptive data, (i) an identification of a corresponding item located at the first geographic location, and (ii) corresponding item-property data associated with the corresponding item at the first geographic location;
  receive, from the user interface, item-property data associated with the item at the selected one of the plurality of geographic locations of interest; and determine a difference between the item-property data at the selected one of the plurality of geographic locations of interest and the corresponding item-property data at the first geographic location, the difference effecting a change in corresponding item-property data in the secure item database server.

22. The mobile device of claim 21, the memory further including instructions that, when executed by the processor, effect the change in corresponding item-property data in the secure item database server by causing the mobile device to instruct the secure item database server to update the corresponding item-property data associated with the corresponding item at the first geographic location to match the item-property data associated with the item at the selected one of the plurality of geographic locations of interest.

23. The mobile device of claim 21, wherein the item associated with the selected one of the plurality of geographic locations of interest is the same as the corresponding item associated with the first geographic location.

24. The mobile device of claim 21, wherein the item associated with the selected one of the plurality of geographic locations of interest is different than the corresponding item associated with the first geographic location, further wherein at least one of an item category, an item type, an item function, or an item classification indicated by the item-descriptive data associated with the item at the selected one of the plurality of geographic locations of interest is the same as at least one of the item category, the item type, the item function, or the item classification of the corresponding item associated with the first geographic location.

25. The mobile device of claim 21, wherein the communication device is at least one of a radio frequency (RF) transceiver, a near-field communication (NFC) device, a Bluetooth® transceiver, a built-in network adapter, a network interface card, a Personal Computer Memory Card International Association (PCMCIA) network card, a card bus network adapter, a wireless network adapter, a USB network adapter, or a modem.

26. The mobile device of claim 21, wherein the step of acquiring item-descriptive data is performed by scanning or photographing at least one of a barcode, a one-dimensional barcode, a two-dimensional barcode, a UPC code, an EAN code, a Code 39, a Code 93, Code 128, an ITF, a codabar, a GS1 databar, an MSI Plessey, a QR code, a Datamatrix code, a PDF417, or an Aztec associated with the item.

27. The mobile device of claim 21, wherein the step of acquiring item-descriptive data is performed by interrogating an RFID tag associated with the item.

28. The mobile device of claim 21, wherein the item-property data includes a price of the item.

* * * * *